No. 844,639. PATENTED FEB. 19, 1907.
L. E. WATERMAN.
SEEDING MACHINE.
APPLICATION FILED APR. 14, 1906.
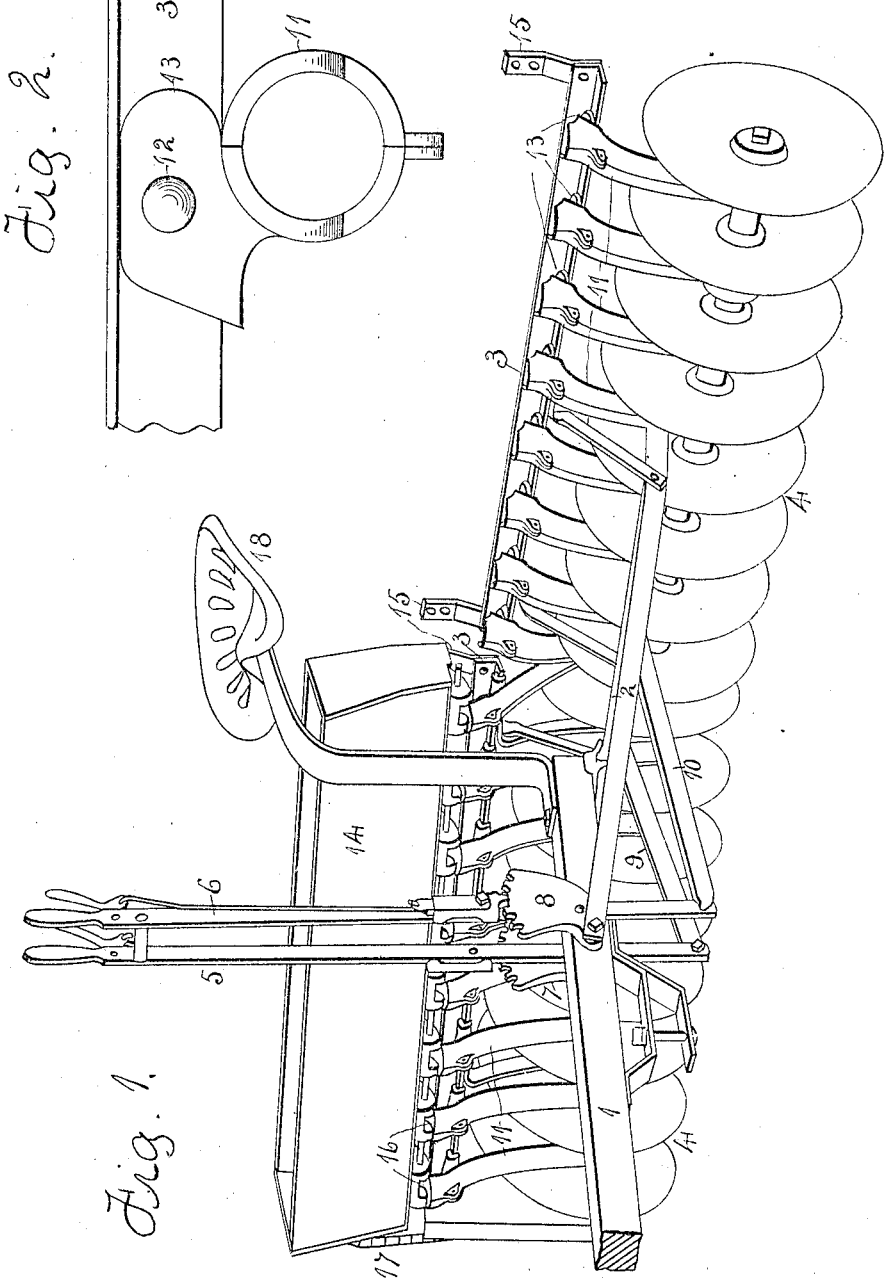
Witnesses:
H. J. Slagle
E. Behel.
Inventor:
Lewis E. Waterman.
By A. O. Behel.
Atty.

UNITED STATES PATENT OFFICE.

LEWIS E WATERMAN, OF ROCKFORD, ILLINOIS, ASSIGNOR TO EMERSON MANUFACTURING COMPANY, OF ROCKFORD, ILLINOIS, A CORPORATION OF ILLINOIS.

SEEDING-MACHINE.

No. 844,639.     Specification of Letters Patent.     Patented Feb. 19, 1907.

Application filed April 14, 1906. Serial No. 311,793.

*To all whom it may concern:*

Be it known that I, LEWIS E. WATERMAN, a citizen of the United States, residing at Rockford, in the county of Winnebago and State of Illinois, have invented certain new and useful Improvements in Seeding-Machines, of which the following is a specification.

The object of this invention is to support the seedbox and seed-tubes independent of each other in their connection with the main frame of the seeding-machine.

In the accompanying drawings, Figure 1 is a perspective view of a seeding-machine, showing my improvements. Fig. 2 is a plan view of a section of the main frame, to which is attached a seed-tube.

My improvements are shown in connection with a disk harrow. The disk harrow comprises the tongue 1, to which is secured the bars 2, which are connected to the main frames 3. The disk gangs 4 are connected with the main frame 3, also with the bars 2. The adjusting-levers 5 and 6 are pivotally connected to the tongue 1. The lever 5 is provided with a toothed quadrant 7, and the lever 6 is provided with a toothed quadrant 8. The lever 5 has a connection with one of the disk gangs by the bar 9, and the lever 6 has a connection with the other disk gang by the bar 10. To the bars 3 of the main frame are secured a series of seed-tubes 11 by the bolts 12 passing through an offset ledge 13,
as shown at Fig. 2. These tubes discharge the seed between the disks and close to the ground.

In the drawings only one seedbox is shown. It is to be understood that each of the disk gangs are to be supplied with a seedbox. The seedbox 14 shown is supported by one of the bars 3, constituting the main frame of a disk gang, and is secured thereto by a bracket at each end, like the one shown at 15.

The seedbox is provided with seed-distributers 16, one for each seed-tube, and which are rotated by the chain connection 17 with one of the disk gangs.

A seat 18 is supported by the tongue 1.

By constructing the seedbox so that it is separable from the main frame and from the seed-tubes the seeder is capable of being shipped in a knockdown condition, and the seed-tubes will be protected by the disks of the disk gangs.

I claim as my invention—

In a seeding-machine, the combination of a main frame, disks supporting the main frame, a plurality of seed-tubes supported by the main frame, and a seedbox removably supported by the main frame independent of the seed-tubes, the seed-tubes leading from the seed-discharge to the ground.

LEWIS E. WATERMAN.

Witnesses:
    A. O. BEHEL,
    E. BEHEL.